March 4, 1969  P. L. HURST ET AL  3,430,507
APPARATUS FOR POSITIONING A BELT DRIVEN GENERATOR
Filed April 10, 1967
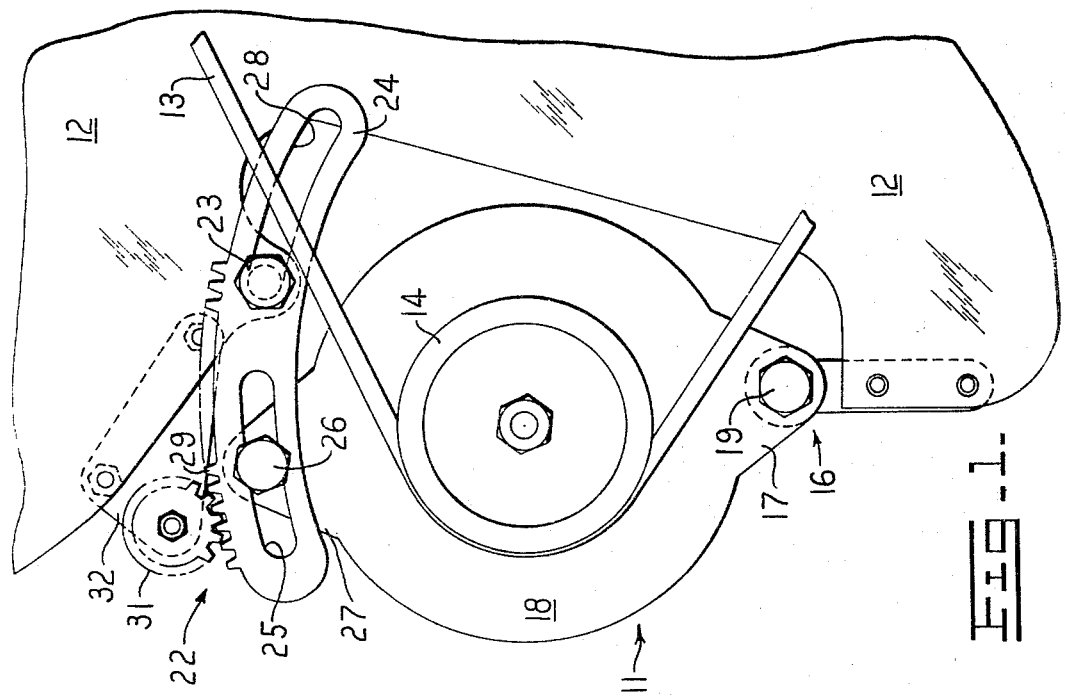
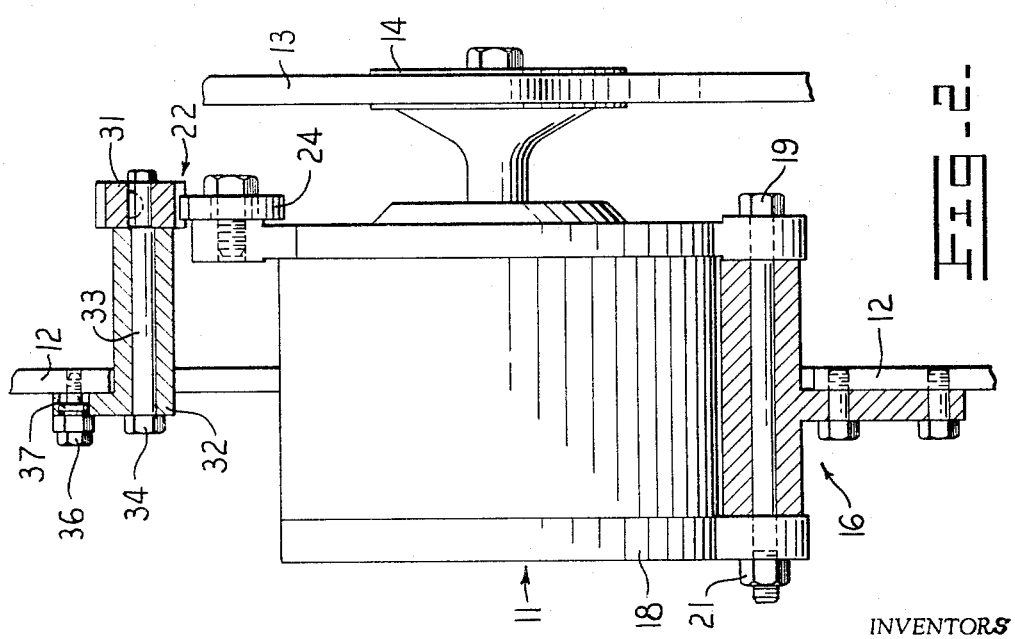
INVENTORS
PAUL L. HURST
JOSEPH OSWALD
BY
Fryer, Tjensvold, Feix, Phillips & Lempio
ATTORNEYS United States Patent Office 3,430,507
Patented Mar. 4, 1969

3,430,507
APPARATUS FOR POSITIONING A BELT
DRIVEN GENERATOR
Paul L. Hurst, Canton, and Joseph Oswald, Tremont, Ill., assignors to Caterpillar Tractor Co., Peoria, Ill., a corporation of California
Filed Apr. 10, 1967, Ser. No. 629,553
US. Cl. 74—242.15     4 Claims
Int. Cl. F16h 7/10

ABSTRACT OF THE DISCLOSURE

Apparatus for positioning a tensioning member against a flexible continuous drive means to provide proper tension in the drive means. Pinion and rack means operable to vary the position of the tensioning member to apply a preselected tensioning force against the drive means. Locking means operable to maintain the preselected tensioning force of the tensioning member against the drive means.

BACKGROUND OF THE INVENTION

The present invention relates to apparatus for positioning a tensioning member against flexible continuous drive means, for example, belt or chain drives. More particularly, the apparatus of the present invention is adapted to a belt-driven generator of an engine assembly wherein the position of the generator provides the proper tension in its continuous drive belt.

In a belt-driven generator associated with an engine, tension in the drive belt between the engine and generator is commonly controlled by varying the position of the generator to apply a tensioning force against the belt. Such a generator may be pivoted about a connection with the engine and forced against the drive belt, for example, by a lever with a locking bolt which is tightened to maintain the generator position against the drive belt.

To insure reasonable bearing and belt life and to provide for proper generator operation, it is desirable to maintain a predetermined tensioning force against the drive belt. Within the above configuration, proper tensioning is difficult because the engine and associated machinery severly limited working space and there is no single way of determining when the belt is properly tensioned. Particularly when the generator support frames are constructed of materials such as aluminum, excessive force applied to the generator by the lever, may often result in breakage of the generator frame.

SUMMARY OF THE INVENTION

The present invention provides apparatus for positioning a tensioning member to apply a preselected tension force against flexible continuous drive means. Pinion and rack means are disposed to interact between the tensioning member and a base member to vary the position of the tensioning member against the drive means to apply a preselected tensioning force thereto. Locking means are disposed with relation to the tensioning member to maintain its preselected tensioning position with respect to the drive means.

BRIEF DESCRIPTION OF THE DRAWINGS

FIG. 1 is a partial front elevation view of a generator driven by an engine through a belt-drive and including the generator positioning apparatus of the present invention.

FIG. 2 is a side elevation view, partially in section, of the assembly of FIG. 1.

DESCRIPTION OF THE PREFERRED EMBODIMENT

The apparatus of the present invention is equally suitable for controlling the position of a tensioning or tightening member associated with any flexible continuous drive means such as a belt or chain. Referring to FIGS. 1 and 2, the present invention is described with reference to a belt-driven generator 11 associated with an engine of which structure indicated at 12 is representative. Driving power is supplied to the generator from the engine through a drive belt 13. A pulley 14 of the generator is disposed against the drive belt to exert a proper tensioning force thereagainst and to transmit driving power from the belt to the generator. The generator pulley is movable with respect to the drive belt by pivoting the generator about a connection 16 between the engine structure 12 and a flange 17 of the generator housing 18. The generator pivot connection 16 includes a bolt 18 passing through the generator flange and a member 20 affixed to the engine structure and having a nut 21 threadedly engaging the bolt.

To facilitate accurate positioning of the generator to apply a preseleted tensioning force against the drive belt, a pinion and rack indicated at 22 is disposed to control the position of the generator. When the generator is at a proper position, a locking means 23 is operable to maintain the generator in that position.

An arcuate strap 24 defines an arcuate positioning slot 25 and is adjustably connected to the generator housing by a positioning screw 26 passing through the positioning slot and engaging a flange 27 of the generator housing. The strap is also adjustably connected to the engine by a locking screw 23 passing through an arcuate locking slot 28 defined in the strap. One edge of the strap is toothed to form rack 29 and a pinion 31 is rotatably supported from a bracket 32 on the engine to mesh with the strap rack. To permit the pinion to be easily rotated, it is keyed to and retained on a reduced end of a journal 33 rotatably disposed in the bracket 32. The distal end of the journal has a hexagonal head 34 by which the pinion is rotatable. A screw 36 passing through a hole in the bracket 32 and engaging the engine includes an eccentric 37 for adjusting the meshing relation between the pinion and rack.

The purpose of the positioning slot and screw is to enable adjustment of the strap to position the rack in proper relation with the pinion, for example, to compensate for drive belts of slightly different length or to initially position the generator pulley generally against the drive belt. It is to be noted that the positioning slot could be eliminated, for example, by a sufficiently long rack to insure continued meshing with the pinion. With the strap positioned with relation to the generator, the pivot connection at 16 and the locking screw are loosened. The pinion is rotated clockwise, e.g., by a torque wrench applied to the journal head, and the strap is moved downwardly to cause the generator pulley to exert tensioning force against the drive belt. When the generator pulley is properly positioned to exert a preselected tensioning force against the drive belt, the locking screw 23 is tightened to stabilize the generator and assist in maintaining belt tension.

Thus, the present invention provides simple and reliable apparatus by which the generator may be positioned to apply a preselected tensioning force to the generator drive belt. The pitch radius of the pinion teeth compared to the pitch radius of the strap rack represents a gear ratio between the pinion gear and pivotal motion of the generator. Tensioning force applied to the drive belt by the generator pulley may thus be converted to a maximum torque force to be applied to the rotatable pinion gear head 36, and a torque measuring wrench used to turn the pinion gear until a preselected tensioning force is applied to the drive belt. The generator is accordingly positioned to permit operation with optimum driving friction and minimum bearing and belt wear. Since only the preselected tensioning force is exerted through the generator against the drive belt, overstressing of the generator brackets is prevented. Further, appropriate placement of the rack and pinion arrangement with respect to the engine and generator permits ready access thereto with a wrench for moving the generator to place a preselected tensioning force against the drive belt.

What is claimed is:

1. Apparatus for positioning a tensioning member against flexible continuous drive means to provide proper tension in the drive means, comprising:
   a base member to which the tensioning member is pivoted,
   an elongated strap defining an arcuate slot,
   means for adjustably securing the tensioning member to the elongated strap,
   a rack and pinion arranged for interaction between the strip and the base member to pivot the tensioning member relative to the base member,
   an element associated with the arcuate slot and the base member for locking the strap to the base member and maintaining proper tension in the drive means, and
   means for maintaining operative alignment of the rack and pinion.

2. The invention of claim 1 wherein the elongated strap defines another arcuate slot, both slots being centered upon the pivot between the tensioning member and the base member, and the means for adjustably securing the tensioning member to the strap comprises a screw passing through the other slot for threaded engagement with the tensioning member.

3. The invention of claim 2 wherein the base member is a portion of an engine, the tensioning member is a generator assembly and the drive means is a belt.

4. The invention of claim 1 wherein the rack is formed along an edge of the strap and the aligning means is an eccentric for mounting the pinion on the base member and aligning the pinion for proper engagement with the rack.

References Cited

UNITED STATES PATENTS

| | | | |
|---|---|---|---|
| 328,373 | 10/1885 | Allfree | 74—242.1 |
| 1,132,496 | 3/1915 | Steffensen | 74—242.1 |
| 1,319,122 | 10/1919 | Shelton | 74—242.1 XR |
| 2,035,096 | 3/1936 | Schneider. | |
| 2,392,573 | 1/1946 | Brock et al. | 74—242.8 XR |
| 3,306,121 | 2/1967 | Jenkins | 74—242.15 |

FRED C. MATTERN, JR., *Primary Examiner.*

JAMES A. WONG, *Assistant Examiner.*